United States Patent Office 3,492,929
Patented Feb. 3, 1970

3,492,929
FLASH CUBE INDEXING SYSTEMS FOR CAMERAS
Karl Heinz Lange, Bunde-Ennigloh, Westphalia, Germany, assignor to Balda-Kamerawerk Rudolf Gruter, Kommanditgesellschaft, Bunde, Westphalia, Germany, a German company
Filed Jan. 19, 1967, Ser. No. 610,291
Claims priority, application Germany, Jan. 28, 1966, B 85,591
Int. Cl. G03b 19/04
U.S. Cl. 95—11                                  6 Claims

ABSTRACT OF THE DISCLOSURE

A photographic camera having a rotatable socket for receiving a flash cube, a spring motor for rotating the socket, a film transport system for tensioning the spring motor, and a slip clutch intermediate the spring motor and the film transport system for permitting advancement of the film to continue after the spring motor has been properly tensioned. The camera has a stop lever which engages one of the lugs on the rotatable socket to prevent rotation thereof during film advancement, and a control member operatively connected with the stop lever for releasing the same from engagement with the lug in response to operation of the control member. The control member is movable between a static position in which the stop lever engages one of the lugs, and an operative position in which the stop lever is disengaged from the lug to thereby permit rotation of the socket. The control member has a separate stop thereon which engages one of the lugs on the socket when the member is being moved from the static to the operative position, to temporarily prevent indexing of the socket, and releases the lug when the member is returning from the operative to the static position to thereby permit indexing of the socket by the spring motor.

---

Figure 1:
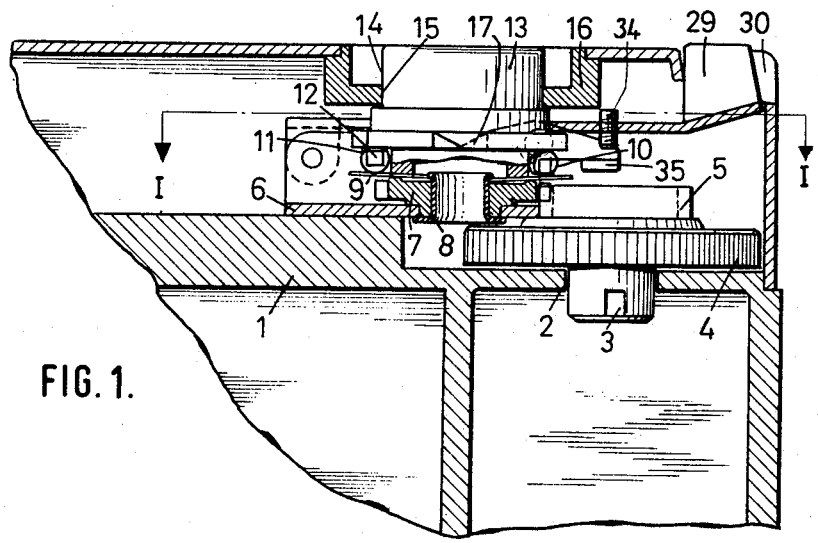

This invention relates to a photographic camera which is provided with a socket for so-called flash cubes. The flash cube is automatically indexed by one station in conjunction with the transport of the film. However, it would be undesirable if the flash cube were to be indexed simultaneously with the film transport motion, because in this case it would be possible for errors to occur in the case of a flash cube unit which is already spent.

According to the invention there is provided in a camera having a film transport system, a flash cube indexing system comprising a flash cube socket rotatably located in said camera proximate said film transport system; a slip clutch coupling said flash cube socket and said film transport system, such clutch being drivingly engaged by said film transport system; spring means disposed between said slip clutch and said flash cube socket for stressing on actuation of said film transport system to advance a film in said camera; stop means movable into and out of a position preventing rotation of said flash cube socket; and control means operatively connected to the stop means and having a static position in which said stop means is positioned to prevent rotation of said flash cube socket; whereby on actuation of said film transport system to advance said film said spring means is tensioned while rotation of said flash cube socket is prevented by said stop means, said slip clutch absorbing any rotation of said film transport system in excess of that required to give said spring means a predetermined stress, and said spring means is then freed by operation of said control means automatically to index the flash cube socket to its next operative position.

It is the function of the friction clutch to compensate for the reduction of the angular rotation of the film transport relative to the uniform rotation of the flash lamps through 90° in each case, the said reduction resulting from the increasing diameter of the film spool.

In one particular form of the invention a plurality of lugs are provided on said flash cube socket, each of said lugs defining an indexing position; and said stop means comprise a spring-loaded locking lever for motion-blocking engagement with one of said flash cube socket lugs in the static position of said control means, displacing means for moving said locking lever out of engagement with the respective flash cube socket lug on operation of said control means to a temporary position so that said flash cube socket is freed for rotation and a stop adapted firstly to be moved into the zone of movement of a second cube socket lug in order to halt temporarily the movement of said flash cube consequent upon its release by said locking lever and secondly upon return of said control means to its static position to be moved out of engagement with said second flash cube socket lug to enable said flash cube socket to index through the desired angle under the influence of said spring means until said locking lever again engages a flash cube socket lug.

Figure 2:
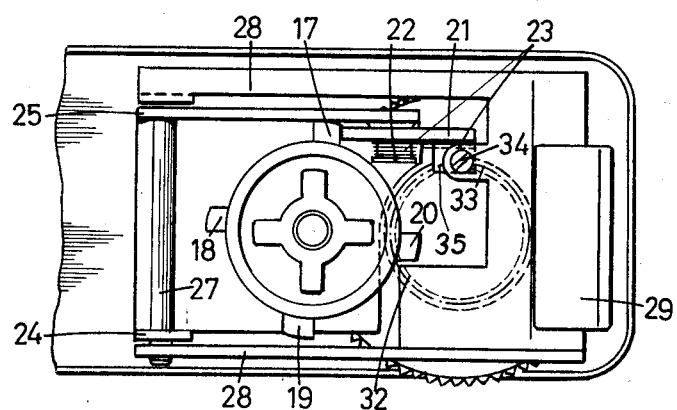

In order that the invention may be more clearly understood an embodiment thereof will now be described, by way of example, with reference to the accompanying drawings, in which:

FIGURE 1 is a vertical cross-section through a flash cube indexing system embodying the invention; and FIGURE 2 is a sectional view along the line I—I of FIG. 1.

The exemplary indexing system in the drawing is shown in a camera having a film transport key 3 engaged with a film spool (not shown in detail) and disposed in camera housing 1 at a bearing position 2. A film transport wheel 4 having a knurled circumference, part of which extends beyond the camera housing for finger operation is permanently coupled to the transport key 3. A toothed extension 5 of wheel 4 is engaged with a gear wheel 7, located in a carrier plate 6 and is also permanently coupled to the film transport key 3. The gear wheel 7, a bush 8 and a sring washer 9 together form a friction clutch, the spring washer 9 being frictionally engaged with the gear wheel 7.

The spring washer 9 is provided with a hook or projection 10 behind which a tension spring 11, for example a helical spring, is engaged, the other end of spring 11 being secured behind a pin or projection 12 of a rotatably located flash cube socket 13. An upper part 14 of the flash cube socket 13 is located in a bore 15 of a bearing ring 16 which also contains the current supply leads (not shown) for the flash cube. The flash cube socket 13 also has on its larger circumference four lugs 17, 18, 19 and 20 which correspond to the four specified indexing positions of the flash cube.

In the flash cube socket position illustrated in FIG. 2 lug 17 is initially in connection with the face lug of a locking lever 21 which is pivotably located on the rivet 22. The said locking lever 21 is spring-loaded by a torsion spring 23, so that the locking lever is normally positioned, i.e., in the static position and during film transport, in the path of movement of lugs 17 to 20 and bears against lug 17 so that it prevents rotation of the flash cube socket 13.

A rocker 28 carries at one end a release button 29, which extends outwardly through the opening 30 of the camera top 31 and is rotatably located on a spindle 27 journalled in the bent lugs 24 and 25 of the plate 6. A separate stop 32 on rocker 28 is disposed directly in front of lug 20 when the release rocker is in the static position, but is initially disposed above the plane of movement of lugs 17-20. A lug 33 on rocker 28 is provided with an adjustable screw 34 as a further rocker arm for acting on a bent lug 35 of the locking lever 21 in order to move the said locking lever out of the path of movement of lugs 17–20 when the rocker is operated.

The operation of the indexing system is as follows,

Assuming that an exposure with the camera has been made and the user advances the film for the next exposure using the film transport wheel 4, the toothed extension 5 will rotate the gear wheel 7 until the film is stopped at the correct time by means such as a perforation in the film. The transmission ratio of the gear wheel 7 and extension 5 is so designed that even a slight rotation of the film transport wheel for the purpose of film transport produces an adeuate rotation of the gear wheel 7 and a prestressing of spring 11 sufficient to enable the flash cube socket to be indexed by at least a quarter rotation. The spring 11 is therefore provided at all times by the gear wheel 7 and the spring washer 9 with sufficient mechanical prestress. On reaching the maximum permissible prestress the frictional system formed by the washer 9, the gear wheel 7 and the bush 8 becomes effective and excessive rotating motion is absorbed without further stressing of the spring.

By depressing the release button 29 on the rocker 28, the lever 21 is driven by the screw 34 and thus moved out of range of the locking lug 17 so that the spring 11 which has been pretressed can rotate the flash cube socket. However, depression of the release rocker will also cause the stop 32 adjoining the said rocker to move into the plane of movement of one of lugs 17–20, thus immediately stopping the flash cube socket after a very short rotary motion. If the user then releases the release button 29, the locking edge of the lever 21 will not engage in front of, but to one side of lug 17, because the flash cube socket will already have executed a slight rotation as far as the stop on the corner 32 which thus still prevents rotation of the flash cube socket.

Immediately prior to reaching the upper limiting position of the rocker 28 on release of the same, the stop 32 will become disengaged to allow further rotation of the flash cube, in this case past lug 20, and the flash cube socket may execute the quarter rotation required for indexing to the next lamp of the flash cube, that is to say, the lever 21 will once again retain the flash cube socket at lug 18. The spring prestressing force thus expended will be once again replaced in the manner described above during the next film transport.

As can be seen, film transportation is initially accompanied only by spring stressing while actuation of the release is initially accompanied by a brief, immediately stopped movement and releasing of the release button is accompanied by complete freeing and indexing of the flash cube socket into the new indexing position.

I claim:

1. In a camera having a film transport system, a flash cube indexing system having a flash cube socket rotatably located in said camera in proximity of said film transport system, said system comprising a slip clutch coupling said flash cube socket and said film transport system, said clutch being drivingly engaged by said film transport system; spring means disposed between said slip clutch and said flash cube socket for being stressed upon actuation of said film transport system advancing a film in said camera; stop means movable into and out of a position preventing rotation of said flash cube socket; and control means operatively connected to the stop means and having a static position in which said stop means is positioned to prevent rotation of said flash cube socket; whereby upon actuation of said film transport system advancing said film said spring means is tensioned while rotation of said flash cube socket is prevented by said stop means, said slip clutch absorbing any rotation of said film transport system in excess of that required to give said spring means a predetermined stress, and said spring means released by operation of said control means for indexing of said flash cube socket to the next operative position thereof.

2. A flash cube indexing system according to claim 1, and comprising a plurality of lugs on said flash cube socket, each of said lugs defining an indexing position; said stop means comprising a spring-loaded locking lever for motion-blocking engagement with one of said flash cube socket lugs in the static position of said control means, displacing means for moving said locking lever out of engagement with the respective flash cube socket lug upon operation of said control means to a temporary position so that said flash cube socket is released for rotation and a separate stop disposed on said control means adapted first to be moved into the zone of movement of a second cube socket lug for halting temporarily the movement of said flash cube socket upon the release by said locking lever, and adapted second upon return of said control means to the static position thereof for being moved out of engagement with said second flash cube socket lug for enabling said flash cube socket to index through the desired angle under the influence of said preset stressed spring means until said locking lever again engages the next following flash cube socket lug.

3. A flash cube indexing system according to claim 2, and said control means including a rocker on which said separate stop is mounted, and said displacing means comprising a displacing arm mounted on said rocker and adapted to move said locking lever out of engagement with its respective flash cube socket lug upon operation of said rocker.

4. A flash cube indexing system according to claim 3, and having a lug on said rocker; said displacing arm comprising an adjustable screw mounted on said lug; and a bent lug arranged on said locking lever for engagement by said adjustable screw when said rocker is actuated.

5. A flash cube indexing system according to claim 4, comprising a pivot pin mounting said locking lever intermediate the ends thereof and a torsion spring placed around said pivot pin.

6. A flash cube indexing system according to claim 5, including a bearing ring presenting a bore in which said flash cube socket is located; current supply leads for a flash cube in said bearing ring; and a spring washer in said slip clutch; said spring means comprising a helical spring having one end fastened to said cube socket and the other end to said spring washer.

References Cited

UNITED STATES PATENTS

| | | | |
|---|---|---|---|
| 3,335,651 | 8/1967 | Williams et al. | 95—11 |
| 3,353,467 | 11/1967 | Ernisse et al. | 95—11.5 |
| 3,353,468 | 11/1967 | Beach | 95—11.5 |

FOREIGN PATENTS 848,012  9/1952  Germany.

NORTON ANSHER, Primary Examiner

F. L. BRAUN, Assistant Examiner

U.S. Cl. X.R.

240—37.1